June 25, 1940. H. L. BUTMAN 2,205,842
PASTRY OR DOUGH ROLLING APPARATUS
Filed Aug. 16, 1939
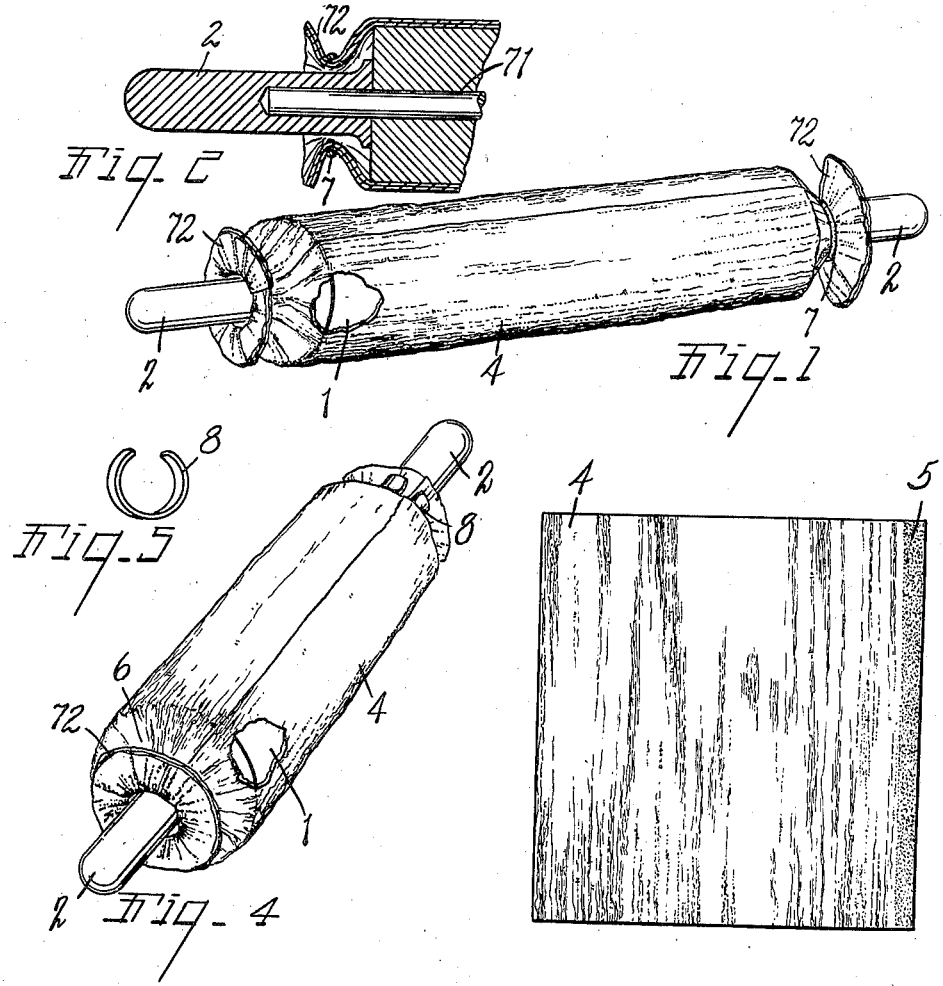
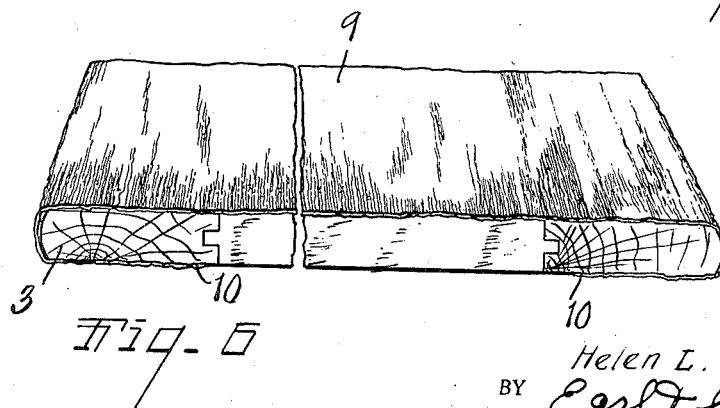
INVENTOR.
Helen L. Butman
BY Earl F. Chappell
ATTORNEYS Patented June 25, 1940

2,205,842

UNITED STATES PATENT OFFICE 2,205,842

PASTRY OR DOUGH ROLLING APPARATUS

Helen L. Butman, Portage Township, Kalamazoo County, Mich.

Application August 16, 1939, Serial No. 290,367

6 Claims. (Cl. 107—50)

This invention relates to improvements in pastry or dough rolling apparatus.

The main objects of this invention are:

First, to provide an apparatus for the rolling preparation of pie crust or like pastry which enables the making of a superior product.

Second, to provide a rolling pin assembly which enables the preparation of pie crust and like products with the use of a minimum of flour during the rolling operation.

Third, to provide a culinary apparatus well adapted for the preparation of products which require molding board manipulation.

Further objects relating to details and economies of the invention will appear from the description to follow. The invention is defined in the claims.

Preferred embodiments of my invention are illustrated in the accompanying drawing, in which:

Fig. 1 is a perspective view of my improved rolling pin assembly.

Fig. 2 is a fragmentary view in central longitudinal section more clearly illustrating details of the invention in relation to the rolling pin structure.

Fig. 3 is a plan view illustrating one of the rolling pin cover sheets embodying the characteristics of my invention.

Fig. 4 is a perspective view of a rolling pin assembly with a modified means of securing the covering of the assembly to the rolling pin.

Fig. 5 is a perspective view illustrating the modified securing means in accordance with Fig. 4.

Fig. 6 is a fragmentary perspective view illustrating the application of a sheet embodying the characteristics of my invention to a molding board.

In the making or preparation of pie crust, I have found that to obtain a light, tender, flaky product it is highly desirable to use a minimum amount of flour in the rolling manipulation. In the common or conventional methods of rolling dough for pie crust by means of a rolling pin and molding board, it has heretofore been necessary to dust or apply a considerable amount of flour to the pin and the board in order to prevent sticking of the dough to the rolling surfaces. A large amount of this flour combines with the dough, with the result in many cases that the pie crust is heavy and lacks the tenderness and flakiness which are so much desired and sought after.

By my invention, I provide a simple, sanitary means particularly desirable for the rolling of pie crust and like pastry with the use of a minimum amount of flour during the rolling operation and with a minimum waste of flour. Another factor of importance is that the use of my invention enables the saving of considerable time both in the rolling operation and in the cleaning-up operation.

My improved rolling pin assembly comprises a rolling pin of well known type having a cylindrical barrel or body 1 with axial handles 2. In Fig. 6, I show a conventional type of wood molding board 3. The covering sheet 4 is provided with a strip of adhesive 5 at one edge, preferably of the character that will adhere to the overlapped portion after moisture has been applied to the adhesive. This sheet is formed of parchmentized creped or crinkled paper, preferably finely and uniformly creped—that is, the crinkles are relatively small and uniformly distributed throughout the surface of the sheet. The length of the covering sheet is such that it may be drawn together or puckered around the handles 2 as shown at 6 and drawn together radially and held in position on the rolling pin by means of a rubber band 7 or other suitable retaining means.

In present day rolling pin construction, it is customary to rotatably mount the body or barrel 1 of the rolling pin relative to the handles 2 as by means of a suitable journal rod 11, as illustrated in Fig. 1, or other equivalent means. Therefore, in order to afford an adequate grip on the handles 2 and to permit the covering sheet to rotate freely relative to the handles I preferably flare radially outwardly the free edges of the sheet 4 as indicated by the reference numeral 12. The creped character of the paper lends itself admirably to this, and furthermore, in the final outwardly flared position of the edges any possible axial slippage of the rubber band 7 or other securing means is prohibited. Of course, this retaining means exerts only sufficient retaining action to hold the sheet in enveloping relation to the rolling pin body 1, and were some such means such as the flared ends not employed, there would be a distinct tendency for it to work axially in use and slip over the sheet ends.

In the modification of Fig. 4, the retaining means is in the form of a spring clip 8. A similar sheet 9 of suitable dimensions is applied to the surface of the molding board preferably by wrapping around the edges thereof and adhesively securing to the bottom of the board at 10 or by other suitable retaining means.

The parchmentized creped paper in the preferred embodiment is glycerine treated, which renders it soft and pliable and readily conformable to the rolling pin body and the handles thereof. The finely crinkled, parchmentized paper presents a surface having a plurality of minute pockets or interstices which receive and retain flour that may be sprinkled thereon or applied thereto. All excess flour may be entirely dusted off or removed.

With my improved rolling pin assembly and its accompanying molding board, pie crust, for example, may be suitably rolled without introducing thereto an undesired amount of flour and without the objection and annoyance of the dough sticking to the molding board surface and the rolling pin. While I greatly prefer the creped, parchmentized, glycerine-treated sheet, finely creped, unparchmentized paper might be used, providing it is of sufficient tensile strength, and a finely perforated open-mesh type of paper may be used as an improvement over the ordinary method, although the creped and parchmentized paper I consider ideal. Inasmuch as the tendency to adhere to the molding surface is substantially eliminated, much time is saved in the matter of manipulation, and as the sheets 4 and 9 are economical, they may be removed and destroyed, thus saving time in the clearing or cleaning-up step. However, if it is desired, the sheets may be wiped after use and reused a number of times, and also it will be apparent that the sheets may be reversed after one side thereof has been used.

The sheet 9, which I designate by a separate numeral from that of the sheet 4 merely for the convenience in reference, may be used to transfer the rolled or shaped dough to a pie tin. If desired, the sheets may bear suitable designs, but the clear sheet is in itself attractive.

The sheets may be prepared for the market in packages, that is, the sheets cut to suitable length, or they may be marketed in rolls perforated to permit severing of the individual sheets.

The resilient clamping and binding means are effective in securing the sheet to the rolling pin so that the sheet is restrained from rotation on the body 1, but rotates freely on the handles 2.

I have illustrated and described my improvements in a form deemed most desirable by me. I have not attempted to illustrate the various additions which I contemplate, as it is believed that this disclosure will enable those skilled in the art to embody or adapt my improvements as may be desired.

Having thus described my invention, what I claim as new and desire to secure by Letters Patent is:

1. Apparatus for use in the rolling of pastry dough with a rolling pin and board adapted to minimize the amount of flour requisite for this operation, comprising a sheet of parchmentized paper having the surface thereof crinkled throughout the effective area thereof, said sheet being adapted to be wrapped around the rolling pin, and resilient means applied to the cylindrical ends of the thus wrapped sheet to secure the same about the ends of said rolling pin, said crinkled paper effectively preventing sticking of dough to the surface thereof whereby to minimize the amount of flour required in the rolling operation.

2. In a culinary apparatus, the combination with a rolling pin provided with axially disposed handles at the ends thereof, of a sheet of creped glycerine-treated parchment paper of a greater length than the body of the rolling pin, wrapped snugly around the body of the pin with its edges in overlapping relation and adhesively secured together and with its ends projecting beyond the body and collapsed and conformed to fit around the handles and secured in such position by resilient clamping means.

3. In a culinary apparatus, the combination with a rolling pin provided with axially disposed handles at the ends thereof, of a sheet of creped paper of a greater length than the body of the rolling pin wrapped snugly around the body of the pin with its edges in overlapping relation and adhesively secured together and with its ends projecting beyond the body and collapsed and conformed to fit around the handles and secured around the ends of the pin by resilient clamping means, the free ends of the thus secured sheet being flared radially outwardly to axially restrain said clamping means and to afford a grip on the handles of said pin.

4. In a culinary apparatus, the combination with a rolling pin provided with axially disposed handles at the ends thereof, of a sheet of finely creped paper of a greater length than the body of the rolling pin, wrapped snugly around the body of the pin with its edges in overlapping relation and secured together and with its ends projecting beyond the body and collapsed and conformed to fit around the handles.

5. The combination with an element having a pastry rolling surface, of means for covering said surface adapted to coact therewith to enable the rolling of pastry with a minimum of flour and prevent sticking of the pastry to the surface, comprising a sheet of parchmentized paper of a size sufficient to cover the area of the surface used in rolling, said paper being finely crinkled and treated with glycerine to render the sheet substantially non-adherent to the pastry, and means for securing said sheet to said element in covering relation to the rolling area of the surface thereof.

6. In pastry rolling apparatus, means adapted to coact with a pastry rolling element in covering relation to the rolling surface thereof, comprising a sheet of parchmentized paper which is finely crinkled and treated to render the sheet soft and flexible and substantially non-adherent to the pastry, said sheet being applied to said element in covering relation to the rolling surface thereof and enabling the rolling of pastry with a minimum of flour, by reason of its characteristic of substantial non-adherence to the pastry.

HELEN L. BUTMAN.